United States Patent
Putnam et al.

(10) Patent No.: US 6,750,161 B2
(45) Date of Patent: Jun. 15, 2004

(54) STRETCHABLE LAMINATE

(75) Inventors: Michael Putnam, Fuquay Varins, NC (US); Sergio Diaz de Leon, Clayton, NC (US); Herbert Hartgrove, Angier, NC (US)

(73) Assignee: Polymer Group, Inc., North Charleston, SC (US)

( * ) Notice: Subject to any disclaimer, the term of this patent is extended or adjusted under 35 U.S.C. 154(b) by 171 days.

(21) Appl. No.: 10/078,038

(22) Filed: Feb. 19, 2002

(65) Prior Publication Data

US 2002/0160676 A1 Oct. 31, 2002

Related U.S. Application Data

(60) Provisional application No. 60/273,041, filed on Mar. 2, 2001.

(51) Int. Cl.[7] .............................. B32B 27/12; D04H 1/46; D04H 3/10
(52) U.S. Cl. .................. 442/105; 442/104; 442/394; 442/408; 428/904
(58) Field of Search ..................... 442/104, 105, 442/394, 408; 428/904

(56) References Cited

U.S. PATENT DOCUMENTS

| | | | |
|---|---|---|---|
| 3,485,706 A | | 12/1969 | Evans |
| 4,248,652 A | * | 2/1981 | Civardi et al. ............. 428/904 |
| 4,612,228 A | * | 9/1986 | Kato et al. ................ 428/904 |
| 4,756,947 A | * | 7/1988 | Nishikawa et al. ......... 428/904 |
| 4,883,012 A | * | 11/1989 | Kennedy .................. 442/408 |
| 5,098,764 A | | 3/1992 | Bassett et al. |
| 5,230,701 A | | 7/1993 | Meyer et al. |
| 5,422,172 A | | 6/1995 | Wu |
| 5,475,903 A | | 12/1995 | Collins |
| 5,670,234 A | | 9/1997 | Suehr et al. |
| 5,674,587 A | | 10/1997 | James et al. |
| 5,827,597 A | | 10/1998 | James et al. |
| 6,299,977 B1 | | 10/2001 | Takeyama et al. |

FOREIGN PATENT DOCUMENTS

| | | |
|---|---|---|
| WO | PCT/US02-04795 | 7/2002 |
| WO | PCT/US02-04795 | 11/2002 |

\* cited by examiner

*Primary Examiner*—Cheryl A. Juska
*Assistant Examiner*—Jenna-Leigh Befumo
(74) *Attorney, Agent, or Firm*—Wood, Phillips, Katz, Clark & Moritmer

(57) ABSTRACT

A stretchable laminate is formed by providing a hydroentangled nonwoven fabric exhibiting cross-direction extensibility and recovery, which fabric comprises a nonwoven web of staple length fibers of about 0.8 to 3.0 denier having a basis weight of about 1.0 to 4.0 ounces per square yard. A polymeric binder composition substantially uniformly applied to the nonwoven web imparts desired elasticity to the web, with the fabric exhibiting at least about 50% extensibility in a cross-direction thereof, and at least about 90% recovery in a cross-direction. The nonwoven web may comprise synthetic fibers, natural fibers, and blends thereof, as well as continuous filaments. An elastomeric composition comprising polyurethane or polyvinylchloride is applied to the extensible nonwoven fabric, which forms the stretchable laminate. The laminate provides a highly conformable and aesthetically pleasing leather-like product.

9 Claims, 1 Drawing Sheet

STRETCHABLE LAMINATE

TECHNICAL FIELD

The present invention relates generally to substrates having elastomeric coatings thereon, such as synthetic leather, and more particularly to a stretchable laminate comprising a hydroentangled nonwoven fabric substrate exhibiting extensibility and recovery in the cross-direction, and an elastomeric coating applied thereto.

BACKGROUND OF THE INVENTION

Nonwoven fabrics are used in a very wide variety of applications where the engineered qualities of the fabric can be advantageously employed. These types of fabrics differ from traditional woven or knitted fabrics in that the fibers or filaments of the fabric are integrated into a coherent web without traditional textile processes. Entanglement of the fibers or filaments of the fabric provide the fabric with the desired integrity, with the application of binder compositions and the like being well known for further enhancing the integrity of the structure.

Various parameters impact the physical characteristics of the nonwoven fabric, including fiber composition and size, fiber orientation, fiber entanglement, and integration of the fibers such as by application of binders or thermal bonding. Variations in these parameters permit fabrics to be engineered for specific applications, thus enhancing the cost-effectiveness of such materials.

While fabrics of this nature have found widespread applicability, the nature of the processes by which they are typically formed can limit the uses for which particular fabrics are suited. Ordinarily, fabrics are manufactured so as to exhibit a "machine direction" (MD), extending along the length of the fabric in the direction in which it is manufactured, and a "cross-direction" (CD) extending perpendicularly to the machine direction. While fabrics can be engineered to exhibit certain properties, these fabrics ordinarily do not exhibit a relatively high degree of recovery, after extension, in the cross-direction.

Another type of manufactured product, which is finding widespread applications are leather-like laminates typically formed by application of an elastomeric or other polymeric composition to a fibrous substrate, which may comprise a woven or nonwoven fabric. Like the above-described nonwoven fabrics, these types of stretchable laminates can be readily engineered to exhibit desired physical properties, including extensibility and recovery and water resistance, and can be formed to provide an aesthetically pleasing texture and appearance.

SUMMARY OF THE INVENTION

The present invention is directed to a stretchable laminate formed by applying an elastomeric composition to a nonwoven fabric exhibiting cross-direction extensibility and recovery. A leather-like product exhibiting a high degree of conformability, and aesthetically pleasing texture and appearance is thus achieved.

The hydroentangled (spun-laced) nonwoven fabric, which forms the substrate of the present laminate has been particularly configured to exhibit elastic characteristics, that is, extensibility and recovery, in the cross-direction of the fabric. The cross-direction (CD) is transverse or perpendicular to the machine-direction (MD) of the fabric, that is, the direction in which the fabric is manufactured and processed, typically extending along the longitudinal axis of the fabric. By configuring the present fabric to exhibit cross-direction elasticity, the fabric can be employed in those applications in which such elastic characteristics are desirable.

A nonwoven fabric for use in the present invention comprises a hydroentangled nonwoven web preferably comprising staple length textile fibers of about 0.8 to 3.0 denier having a basis weight of about 1.0 to 6.0 ounces per square yard, preferably 2.0 to 4.0 ounces per square yard. More preferably, the nonwoven web comprises fibers of about 1.5 denier, with the web having a basis weight of about 2.5 to 3.5 ounces per square yard. Use of polyester fibers is presently preferred, but it is within the purview of the present invention to form the present nonwoven fabric from blends, which include at least a portion of synthetic fibers blended with natural fibers, and from substantially continuous filaments.

The nonwoven web is subjected to hydroentanglement in order to entangle and integrate the fibers of the web, and thus lends integrity to the structure. In a current preferred embodiment, hydroentanglement is effected so as to impart a rectilinear pattern to the nonwoven web, which pattern is preferably oriented at an angle between about 30° and 60° relative to a machine-direction of the web. In a preferred method of formation, the nonwoven web is subjected to preliminary hydroentanglement to lend integrity thereto prior to formation of the rectilinear pattern in the web by hydroentanglement on a patterned forming surface.

In order to impart elastomeric characteristics to the fabric formed by hydroentanglement, a polymeric binder composition is substantially uniformly applied to the nonwoven fabric. Although the specific amount of binder can be varied while keeping with the principles disclosed herein, it is presently preferred that the binder composition comprise between about 17% and about 31%, by weight, of acrylic binder. Subsequent to application of the polymeric binder composition, the nonwoven web is dried to form the nonwoven fabric, which provides the substrate of the present stretchable laminate. Significantly, the resultant nonwoven fabric exhibits elastomeric characteristics (i.e., stretch or extensibility, and recovery) in the cross-direction of the fabric. In accordance with the present invention, the fabric exhibits at least about 20% extensibility in the cross-direction, and at least about 90% recovery in the cross-direction, preferably at least about 50% extensibility in the cross-direction, with at least about 90% recovery. The fabric is thus engineered to exhibit a relatively high degree of cross-direction elasticity.

In order to form the stretchable laminate embodying the principles of the present invention, the above-described nonwoven fabric is coated with an elastomeric composition, which composition is selected from the group consisting of polyurethane and polyvinylchloride (PVC). The nonwoven fabric substrate can be covered with a layer of the elastomeric coating, with the coating having a thickness of about 0.020 inches to 0.125 inches. The resultant stretchable laminate exhibits leather-like characteristics, and is highly conformable, thus facilitating its use for apparel, upholstery, and footwear.

Other features and advantages of the present invention will become readily apparent from the following detailed description, the accompanying drawings, and the appended claims.

DETAILED DESCRIPTION

Figure 1:
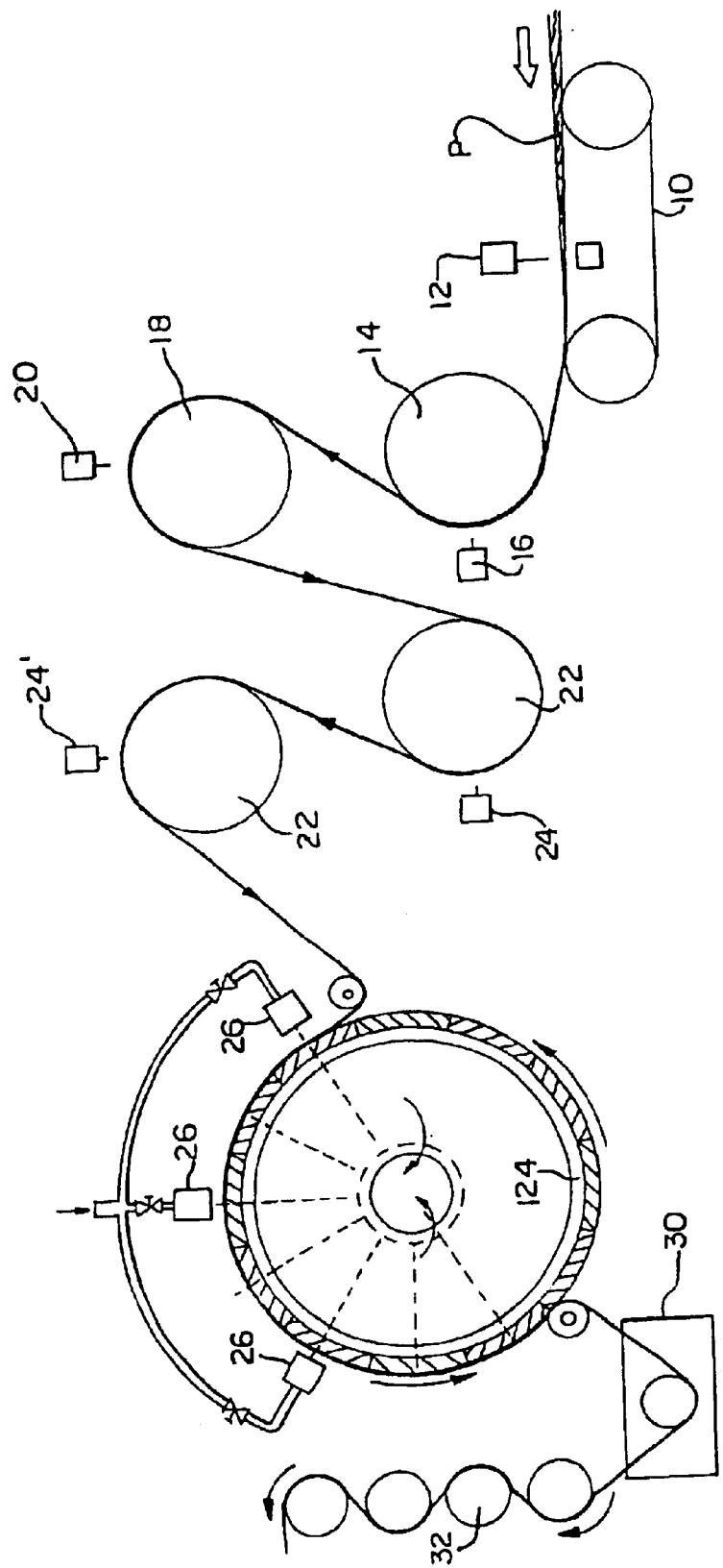
FIG. 1 is a diagrammatic view of one form of an apparatus for forming the present nonwoven fabric according to one form of the method of the present invention.

While the present invention is susceptible of embodiment in various forms, there is shown in the drawings and will hereinafter be described a presently preferred embodiment, with the understanding that the present disclosure is to be considered as an exemplification of the invention, and is not intended to limit the invention to the specific embodiment illustrated.

U.S. Pat. No. 3,485,706, to Evans, hereby incorporated by reference, discloses a process for effecting hydroentanglement of nonwoven fabrics.

U.S. Pat. No. 5,098,764, hereby incorporated by reference, discloses a nonwoven fabric having unique characteristics and properties, which permit use of the fabric in a wide variety of applications. A method and apparatus for manufacturing the fabric are also disclosed, including a hydroentanglement (sometimes referred to as spun-laced) process by which a precursor nonwoven web of fibers is subjected to hydroentanglement on a forming surface to impart a rectilinear pattern to the web. The present invention can be practiced in accordance with the teachings of this patent, and as appropriate, reference will be made to this patent in connection with the present disclosure.

U.S. Pat. Nos. 5,670,234, 5,674,587, and 5,827,597, hereby incorporated by reference, disclose a topographical support member, which can be employed for imparting a pattern to a nonwoven fabric during hydroentanglement, with the resultant fabric again having desirable properties, which lend it for use in many different applications. Fabrics formed in accordance with the teachings of this fabric are sometimes referred to as "tricot".

The present invention contemplates use of the methods disclosed in the above-referenced patents for manufacture of a nonwoven fabric exhibiting elastomeric characteristics, that is, extensibility and recovery, in the cross-direction of the fabric, with the fabric providing the substrate for the stretchable laminate of the present invention. Nonwoven fabrics typically exhibit a machine-direction and a cross-direction, that is, with reference to the direction, which extends the length of the fabric, i.e., the direction in which it is manufactured (the machine-direction), and the direction of the fabric that extends perpendicularly to the machine-direction, typically across the width of the fabric.

The orientation of fibers or filaments of a nonwoven fabric, with respect to the cross-direction and machine-direction, can significantly impact upon the resultant properties and characteristics of the fabric. As will be recognized by those familiar with the art, a precursor web formed by "100% in-line card" refers to a web formed entirely from carded fibers, wherein all of the fibers are principally oriented in the machine direction of the web. In contrast, a precursor web formed by "all crosslap" refers to a fibrous web wherein the fibers or filaments have been formed by crosslapping a carded web so that the fibers or filaments are oriented at an angle relative to the machine direction of the resultant web. A precursor web can be formed by "one-half crosslap, one-half card", wherein one-half of the basis weight of the precursor web comprises a carded fiber web, and one-half of the basis weight comprises a crosslap fiber web. A precursor web may further be formed with combinations of in-line carded fibers with machine direction orientation, and cross directional randomized fibers. Reference herein to "low draft" and "high draft" precursor webs makes reference to the degree of elongation or draft to which the precursor web is subjected prior to hydroentanglement, with low draft typically referring to elongation on the order of 2.0 to 1.0, with high draft typically referring to elongation on the order of 3.5 to 1.0. U.S. Pat. No. 5,4475,903, hereby incorporated by reference, illustrates a web drafting apparatus.

Manufacture of a nonwoven fabric employed as the substrate for the present invention is initiated by providing a precursor nonwoven web which preferably comprises staple length textile fibers of about 0.8 to about 3.0 denier having a basis weight of about 1.0 to about 4.0 ounces per square yard. It is contemplated that the present invention can be practiced with the use of synthetic fibers, natural fibers, and blends thereof, as well as continuous filaments, including polyester (PET), splittable polyester/polyamide fibers, nylon, cotton, rayon, agamid-based, melamine-based fibers, and blends thereof. Splittable PET/PET, PET/PLA, PA/CoPa, PET/CoPET, Novex, Kevlar, Bassofil and Twaron fibers, and blends thereof, can be used for substrate formation. In current practice of the present invention, polyester staple length fibers having a denier of about 1.5 have been used. These fibers are commercially available under the product designation 54W, from Dupont Akra.

A precursor web is formed in accordance with conventional carding and crosslapping techniques prior to subjecting the web to hydroentanglement, and binder application in accordance with the present invention. In the preferred form, the precursor web is subjected to hydroentanglement prior to patterned hydroentanglement of the web in accordance with the above-referenced patents. FIG. 1 diagrammatically illustrates the apparatus for practicing the method of the present invention. As shown, a precursor web P is initially received on a belt 10 having a mesh size of 103×78, Style 103A from Albany International, at which the web P is subjected to the first of a series of hydroentangling treatments. For a fabric basis weight of 2 ounces per square yard (plus or minus 7%), a line speed of approximately 62 yards per minute is employed. Hydroentanglement of the web P being carried by belt 10 is effected by nozzle assembly 12 which is operated at 35 bar to discharge columnar jets or streams of liquid, typically water, and includes 120 micron orifices spaced across the width of the web P at 42.3 per inch, with the orifices approximately 1.5 inches above the web.

The precursor web then moves to an entangling drum 14 having a 100 mesh screen surface. Nozzle assembly 16 is configured like nozzle assembly 12, and is operated at 70 bar. The precursor web is then moved to a processing drum 18, also having a 100 mesh screen, at which it is subjected to entangling by nozzle assembly 20, configured like nozzle assemblies 12 and 16, being operated at 60 bar.

The precursor web is then received about two successive processing drums 22 having micro-porous shells, each having a respective nozzle assembly 24, 24', configured as the above-described nozzle assemblies, with nozzle assembly 24 being operated at a pressure of 100 bar, and nozzle assembly 24" being at 0 bar. The precursor web has generally been subjected to entanglement energy on the order of 0.05 to 0.30 horsepower-hour per pound, with the web now directed to a hydroentangling apparatus for patterned hydroentanglement of the precursor web.

The illustrated embodiment of the final entangling apparatus is in accordance with above-referenced U.S. Pat. No. 5,098,764, and includes a processing drum 124 (sometimes referred to as an ITD, or image transfer device) which receives the precursor web P and which typically imparts a final pattern to the web. The web is subjected to hydroentanglement from three nozzle assemblies, designated 26, at a line speed of approximately 35 yards per minute, and an entangling pressure of 150 bar. Each of the nozzle assemblies is preferably configured in accordance with the above-described nozzle assemblies.

Subsequent to patterned hydroentanglement, the web receives a substantially uniform application of a polymeric binder composition at an application station 30. The web is then directed over a series of drying rollers 32, operated at 310° F., with manufacture of the nonwoven fabric of the present invention thus completed.

In a present embodiment, a binder composition, comprising an elastomeric emulsion, having the following formulation has been employed in the bath of the application station.

Tween 20 (Wetting Agent) 0.2%

Antifoam Y-30 (Silicone Defoamer) 0.025%

10% Aqua Ammonia 0.3%

San Cure 861 (Polyurethane) 0.7%

Hystretch V-29 (Acrylic Binder) X% (variable)

Water Balance of Bath

Tween 20 is commercially available from ICI Chemicals, while Antifoam Y-30 is commercially available from Dow Chemical. Aqua Ammonia is commercially available from Ashland Chemical, while San Cure 861 is available from B. F. Goodrich Company. Hystretch V-29 acrylic binder is commercially available from the B. F. Goodrich Company. This acrylic binder is soft and elastic, and exhibits solvent resistance, excellent U.V. stability, dirt resistance, and low temperature flexibility.

As noted above, various combinations of fiber orientation and binder add-on can be successfully employed in achieving a nonwoven, which can be used as the substrate of the stretchable laminate of the present invention. Thus, the binder add-on or "finish level" of the finished nonwoven fabric can be varied in accordance with the teachings herein. It is desirable to have sufficient add-on to achieve the necessary fabric durability, which durability generally corresponds to the washability of the fabric.

Stretch or extensibility, and recovery characteristics of the nonwoven fabric, in the cross-direction, have been selected to facilitate use of the fabric as a substrate to form the present highly conformable stretchable laminate. It is presently preferred that the nonwoven fabric exhibit extensibility in the cross-direction of at least about 50%, and more preferably at least about 60%. It is preferred that the nonwoven fabric exhibit initial recovery of at least about 90%, with initial recovery of at least about 95% being particularly preferred. The following test methodology is employed for testing of fabrics, with this methodology being a modification of ASTM 3107-75, re-approved 1980, hereby incorporated by reference.

The scope of the present methodology is for measuring stretch or extensibility under a constant weight for a set length of time, and for measuring recovery of stretch in the same fabric. Samples are prepared by cutting 2 inch by 20 inch (MD×CD) from the center, left side, and right side of a fabric sample. Cuts are taken no closer than 6 inches from the edge of the sample. A ruler with measurements in 0.10 inch increments is employed. The test employs one of five standardized weights (2.0, 2.5, 3.0, 3.5, or 4.0 pounds) depending upon the basis weight of the fabric, as set forth below. Starting 4 inches from the top each sample, a 10 inch section is bench marked. A clip is attached to the top of the sample and the sample is supported on a rack. Depending upon fabric basis weights, the following test weights are employed:

BASIS WEIGHT (Per Yard$^2$)/TEST WEIGHT 1.0–3.9 ounces/(2.0 pounds)

4.0–4.9 ounces/(2.5 pounds)

5.0–5.9 ounces/(3.0 pounds)

6.0–6.9 ounces/(3.5 pounds)

7.0–7.9 ounces/(4.0 pounds)

The weight assembly for the correct weight range is attached with a spring clip to the bottom of the sample. The sample is suspended, under the influence of weight, for 15 seconds. The calibrated ruler is used to measure the new, stretched length of the original sample, i.e., the distance between the ends of the original 10 inch marked section of the sample. This reading is recorded as B. The weight is removed, and the sample removed from the clips and rack. The sample is laid flat on a table or like surface. After 5 minutes to condition the sample, the relaxed length of the original sample, i.e., the distance between the ends of the 10 inch marked section is measured, thus providing record reading C.

Calculations are made in accordance with the following:

Percent stretch=$(B-10)\times 10$

Percent recovery=100 minus $[(C-10)\times 100]$

Average readings are taken from side, center, and side of the tested fabric.

EXAMPLES

Table 1 shows the results of testing various nonwoven fabrics, which can be used as the substrate of the stretchable laminate of the present invention. Table 1 correlates the results with reference to increasing fabric basis weight.

Reference in the test data to "ITD" refers to "image transfer device", and refers to the specific form of the device for patterning the precursor web prior to binder application. In the test data, the "20×20" refers to a rectilinear forming pattern having 20 lines per inch by 20 lines per inch configured in accordance with FIGS. 12 and 13 of U. S. Pat. No. 5,098,764 except mid pyramid drain holes are omitted. Drain holes are present at each corner of the pyramid (four holes surround the pyramid). The "20×20" pattern is oriented 45 degrees relative to the machine direction, with a pyramidal height of 0.025 inches and drain holes having a diameter of 0.02 inches.

The "18×8" pattern, again in accordance with FIGS. 12 and 13 of U.S. Pat. No. 5,098,764, has a rectangular pyramidal structure that is approximately 0.085 inches by 0.03 inches at the base. Three drain holes are located along the 0.085 inch side, one at mid pyramid and one at each corner (six holes surround the pyramid). There is no drain hole in the mid location of the 0.03 inch dimension. Drain holes are 0.02 inches diameter and pyramid height is 0.07 inches. The longer axis of each pyramid of this forming surface was oriented 30 degrees relative to the machine direction.

Reference in the test data to a "tricot" image makes reference to a pattern configured in accordance with U.S. Pat. No. 5,674,587.

Reference in the test data to "web forming method" is indicative of fiber orientation. Designation A refers to use of an all crosslap, low draft, polyester fiber web. Designation B refers to a web formed from one-half crosslap, and one-half carded polyester fiber webs. Designation C refers to a 100% in-line carded polyester fiber web. Designation D refers to a web having 70% in-line card with machine direction orientation, and 30% cross directional randomized polyester fibers. Designation E refers to an all crosslap polyester fiber web with high draft.

Percentage of binder reflected in the test data shows the percent of the polymeric binder composition, which comprises acrylic binder, by weight.

In the accompanying test data, "% binder concentration" refers to the variable "X%", that is, the percent, by weight, of the binder bath composition which comprises the acrylic binder. Samples of the binder composition can be dried and weighed to determine the "percent solids" of the composition. Depending upon the amount of binder composition applied to the nonwoven fabric (in current practice, the "wet pick-up" of the binder composition is targeted at 130% <=~5%, based upon a target fabric weight of 2.5 ounces per square yard), the weight of solids applied to the fabric can be readily calculated. For example, "21% binder concentration" corresponds to approximately 0.35 ounces per square yard of solids applied to a nonwoven fabric having a basis weight of 2.0 ounces per square yard.

As will be observed, a number of the illustrated samples provided cross-direction stretch and recovery characteristics whereby the fabric can be used as the substrate of the stretchable laminate of the present invention. As will be appreciated, variations in fiber orientation and binder add-on can be made, while still achieving the desired characteristics for the resultant web.

Fabrics formed for use as the substrate of the present invention preferably exhibit a ratio of machine direction tensile strength to cross-direction tensile strength of about 1:1 to about 3:1, more preferably about 2:1. This ratio is preferably less than about 5:1, which would be typical of fabrics formed from a 100% carded fiber web. An Instron Model 4465 can be employed for testing.

In accordance one preferred form of the present invention, the nonwoven fabric of the stretchable laminate comprises staple length polyester fibers of about 0.8 to 3.0 denier having a basis weight of about 1.0 to 4.0 ounces per square yard. Polymeric binder compositions are substantially uniformly applied to the nonwoven web of the fabric, with the binder composition comprising between about 17% and 31%, by weight, of acrylic binder. The fabric exhibits at least about 50% extensibility in the cross-direction, and more preferably at least about 60%, and at least about 90% recovery in the cross-direction, and more preferably at least about 95%.

Fabrics which are presently particularly preferred are designated in the Table as formed on a 20×20 @ 45 image transfer device, with 26% add-on, formed from web forming method C (100% in-line carded web) and D (70% in-line card, 30% cross-directional randomized fibers).

In accordance with the present invention, the above-described nonwoven fabric is used as a substrate for a synthetic leather product, with the nonwoven fabric receiving a flexible coating selected from the group consisting of polyurethane and polyvinylchloride to impart a leather-like look, while obtaining a stretchable laminate that can provide properties of fit and conformability for applications where this can be a critical performance component. Such applications can include upholstery, where the present stretchable laminate affords a better fit to shape the substrate and conform it to a piece of furniture, or athletic shoes where fit is also critical in certain sections of the shoe to provide tight control of the ankle.

The nonwoven fabric substrate can be covered with the elastomeric composition so that the composition has a basis weight from 10 g/m$^2$ to 240 g/m$^2$, with a thickness between about 0.020 inches to 0.125 inches, depending on the application. The coating can be applied to the nonwoven fabric substrate by extrusion or in accordance with other known application and coating techniques.

From the foregoing, it will be observed that numerous modifications and variations can be effected without departing from the true spirit and scope of the novel concept of the present invention. It is to be understood that no limitation with respect to the specific embodiment illustrated herein is intended or should be inferred. The disclosure is intended to cover, by the appended claims, all such modifications as fall within the scope of the claims.

TABLE 1

| Basic Weight (oz/y$^2$) | ITD | Web Forming Method (A–E) | Binder Concentration (%) | Tensile MD | Tensile CD | Stretch (%) | Recovery (%) |
| --- | --- | --- | --- | --- | --- | --- | --- |
| 2.4 | 18 × 8 | E | 0 | 58.6 | 36.7 | 43 | 81 |
| 2.5 | 20 × 20 @ 45 | B | 14 | 58.5 | 26.6 | 54 | 92 |
| 2.5 | 18 × 8 | E | 7 | 70.7 | 38.9 | 53 | 88 |
| 2.6 | 20 × 20 @ 45 | B | 21 | 62.8 | 30.5 | 50 | 93 |
| 2.6 | 20 × 20 @ 45 | E | 0 | 73.4 | 34.1 | 65 | 84 |
| 2.6 | 20 × 20 @ 45 | E | 7 | 67.8 | 36.2 | 55 | 88 |
| 2.7 | TRICOT | B | 26 | 66.0 | 32.4 | 34 | 97 |
| 2.7 | 20 × 20 @ 45 | E | 14 | 73.9 | 73.9 | 52 | 93 |
| 2.8 | 20 × 20 @ 45 | B | 31 | 59.0 | 33.1 | 41 | 98 |
| 2.8 | 18 × 8 | B | 21 | 61.6 | 31.1 | 49 | 95 |
| 2.9 | 20 × 20 @ 45 | D | 21 | 59.8 | 25.5 | 60 | 92 |
| 2.9 | 20 × 20 @ 45 | B | 26 | 66.5 | 32.2 | 55 | 95 |
| 3.0 | 20 × 20 @ 45 | D | 14 | 54.9 | 28.8 | 51 | 95 |
| 3.0 | 18 × 8 | A | 21 | 72.3 | 46.1 | 22 | 99 |
| 3.1 | TRICOT | C | 26 | 67.4 | 21.3 | 96 | 80 |
| 3.1 | 18 × 8 | D | 14 | 52.2 | 23.4 | 57 | 95 |
| 3.2 | TRICOT | C | 21 | 73.2 | 19.1 | 107 | 83 |
| 3.3 | 20 × 20 @ 45 | C | 26 | 67.6 | 28.6 | 60 | 96 |
| 3.5 | 20 × 20 @ 45 | A | 21 | 83.8 | 49.9 | 28 | 99 |
| 3.6 | 20 × 20 @ 45 | D | 26 | 70.2 | 24.6 | 67 | 94 |
| 3.7 | 20 × 20 @ 45 | C | 31 | 67.7 | 21.3 | 97 | 90 |
| 3.9 | 20 × 20 @ 45 | D | 31 | 65.6 | 30.7 | 66 | 95 |

What is claimed is:

1. A stretchable laminate comprising:
   a nonwoven fabric comprising a fibrous matrix of hydroentangled staple length fibers of about 0.8 to 3.0 denier having a basis weight of about 1.0 to 4.0 ounces per square yard, with a polymeric binder composition substantially uniformly applied to said fibrous matrix; and
   an elastomeric composition substantially uniformly applied to said nonwoven fabric web, said elastomeric composition having a thickness of about 0.020 to 0.125 inches.

2. A stretchable laminate in accordance with claim 1, wherein said nonwoven fabric comprises fibers of about 1.5 denier, said web having a basis weight of about 2.5 to 3.5 ounces per square yard.

3. A stretchable laminate in accordance with claim 1, wherein said nonwoven fabric has a machine-direction and a cross-direction, and exhibits at least about 50% extensibility in a cross-direction, and at least about 90% recovery in the cross direction.

4. A stretchable laminate in accordance with claim 3, wherein said nonwoven fabric exhibits a ratio of machine-direction tensile strength to cross-direction tensile strength of about 1:1 to about 3:1.

5. A stretchable laminate in accordance with claim 1, wherein said elastomeric composition is selected from the group consisting of polyurethane and polyvinylchloride.

6. A stretchable laminate in accordance with claim 1, wherein said laminate has a leather-like texture and appearance.

7. A method of making a stretchable laminate, comprising the steps of:
   providing a nonwoven web comprising staple length fibers of about 0.8 to 3.0 denier having a basis weight of about 1.0 to 4.0 ounces per square yard;
   hydroentangling said nonwoven web;
   applying a polymeric binder composition substantially uniformly to said nonwoven web;
   drying said nonwoven web to form a nonwoven fabric with said binder composition comprising between about 17% and 31%, by weight, of said acrylic binder, said fabric having a machine direction and a cross-direction, and exhibiting at least about 50% extensibility in said cross-direction, and at least about 90% recovery in the cross-direction; and a ratio of machine direction tensile strength to cross-direction tensile strength of about 1:1 to 3:1; and
   applying an elastomeric composition to said nonwoven fabric, said elastomeric composition being selected from the group consisting of polyurethane and polyvinylchloride, and having a thickness of about 0.020 to 0.125 inches.

8. A method of making a stretchable laminate in accordance with claim 7, wherein said stretchable laminate is a furniture cover.

9. A method of making stretchable laminate as in claim 7, wherein said stretchable laminate is a shoe upper.

* * * * *